(12) United States Patent
Gatellier et al.

(10) Patent No.: US 8,505,517 B2
(45) Date of Patent: Aug. 13, 2013

(54) METHOD FOR REINTRODUCING EXHAUST GAS TO THE INTAKE OF AN INTERNAL-COMBUSTION ENGINE AND ENGINE USING SAME

(75) Inventors: Bertrand Gatellier, Bougival (FR); Dominique Soleri, Lyons (FR); Bruno Walter, Colombes (FR)

(73) Assignee: IFP, Rueil-Malmaison Cedex (FR)

( * ) Notice: Subject to any disclaimer, the term of this patent is extended or adjusted under 35 U.S.C. 154(b) by 64 days.

(21) Appl. No.: 12/189,349

(22) Filed: Aug. 11, 2008

(65) Prior Publication Data

US 2009/0044790 A1    Feb. 19, 2009

(30) Foreign Application Priority Data

Aug. 14, 2007    (FR) ...................................... 07 05844

(51) Int. Cl.
  *F02B 47/08*      (2006.01)
  *F02M 25/07*     (2006.01)
(52) U.S. Cl.
  USPC ................................ 123/568.14; 123/568.12
(58) Field of Classification Search
  USPC .................. 123/563, 568.12, 568.13, 568.14, 123/316, 432, 184.45, 184.52, 185.54, 90.15; 60/599, 278, 320, 321
  See application file for complete search history.

(56) References Cited

U.S. PATENT DOCUMENTS

| | | | | |
|---|---|---|---|---|
| 2,215,579 A | * | 9/1940 | Eichelberg | 123/76 |
| 3,919,986 A | * | 11/1975 | Goto | 123/316 |
| 5,203,310 A | * | 4/1993 | Gatellier | 123/568.13 |
| 6,102,014 A | * | 8/2000 | Donaldson | 123/568.12 |
| 6,932,063 B1 | * | 8/2005 | Hu | 123/568.14 |
| 2001/0050070 A1 | * | 12/2001 | Xu et al. | 123/295 |
| 2005/0199229 A1 | * | 9/2005 | Eitel et al. | 123/568.12 |

FOREIGN PATENT DOCUMENTS

| | | |
|---|---|---|
| EP | 1 489 283 A1 | 12/2004 |
| JP | 61-098914 | 5/1986 |
| WO | WO 2006/074777 A1 | 7/2006 |

OTHER PUBLICATIONS

French Search Report, FR 0705844, Apr. 28, 2008.

* cited by examiner

*Primary Examiner* — Willis R Wolfe, Jr.
*Assistant Examiner* — Anthony L Bacon
(74) *Attorney, Agent, or Firm* — Antonelli, Terry, Stout & Kraus, LLP.

(57) ABSTRACT

The present invention relates to a method for reintroducing exhaust gas to the intake of an internal-combustion engine wherein, during the engine exhaust phase, part of the exhaust qas contained in combustion chamber (60) of cylinder (10) of the engine is fed, for an operating range of this engine, into a first fluid circulation circuit (C1) and the other part of said gas is discharged into an exhaust circuit. According to the invention, the method consists: during the engine intake phase, in cooling the exhaust qas fed into fluid circulation circuit (C1), in mixing the cooled recirculated exhaust qas with fresh supply air (AF) coming from engine supply circuit (44), in feeding the mixture of recirculated exhaust gas and of supply air into a second fluid circulation circuit (C2), and in cooling said mixture fed into second circuit (C2) prior to feeding it into combustion chamber (60).

11 Claims, 2 Drawing Sheets

METHOD FOR REINTRODUCING EXHAUST GAS TO THE INTAKE OF AN INTERNAL-COMBUSTION ENGINE AND ENGINE USING SAME

FIELD OF THE INVENTION

The present invention relates to a method for reintroducing exhaust gas to the intake of an internal-combustion engine and to an engine using same.

In internal-combustion engines of this type, reintroduction of exhaust gas to the intake allows to significantly reduce the proportion of nitrogen oxides (NOx) discharged into the atmosphere.

BACKGROUND OF THE INVENTION

This recirculation is generally carried out by means of a circuit referred to as EGR (Exhaust Gas Recirculation) circuit comprising a pipe connecting the engine exhaust manifold to the intake distributor thereof and a valve, referred to as EGR valve, arranged in this pipe.

As it is widely known, in order to be able to minimize NOx discharge into the atmosphere, this recirculated exhaust gas is generally cooled prior to being fed to the engine intake. A heat exchanger is therefore arranged on the pipe and the exhaust gas is cooled while flowing therethrough.

This EGR circuit layout is well known to the person skilled in the art and it is better known as "external EGR".

What is also known, as described in document WO-2006/018,699, is an "internal EGR", commonly referred to as "IGR" (Internal Gas Recirculation or Internal Gas Residual), which allows to reintroduce exhaust gas to the engine intake without using a specific external exhaust gas recirculation circuit.

The internal-combustion engine therefore comprises a cylinder provided with a combustion chamber, an exhaust means with an exhaust valve, an exhaust manifold, an intake means with an intake valve, an intake distributor and a recirculated exhaust gas cooling exchanger, or cooler, arranged in the intake distributor.

In this type of engine, the exhaust gas is reintroduced to the intake in order to be mixed with the fresh air flowing in during the engine intake phase.

Thus, during the engine exhaust phase during which the exhaust valve is open, the intake valve is also open for a predetermined time. The exhaust gas contained in the combustion chamber is discharged simultaneously to the exhaust manifold and to the intake distributor. In the example described, the intake valve closes before the end of the exhaust phase and advantageously before the exhaust valve closes. In the example illustrated by this document, the exhaust gas contained in the intake distributor is cooled by the cooler and kept in this distributor at the desired temperature.

During the engine intake phase, the intake valve opens again, substantially as the exhaust valve closes. The cooled exhaust gas contained in the distributor and the fresh air flowing in are fed, through the intake valve, into the engine combustion chamber for the rest of the combustion cycle.

This layout, although satisfactory, however involves some quite significant drawbacks.

In fact, introduction of the recirculated exhaust gas and of the fresh air into the combustion chamber does not allow to obtain homogeneous mixing of the two fluids. This has the effect of disturbing the combustion of the mixture upon fuel injection in the neighborhood of the end of the engine compression phase.

Furthermore, during circulation of the exhaust gas in the cooler, the latter fouls up through deposition of the particles carried by the gas. The cooler therefore loses its exchange capacity, thus decreasing the performance thereof.

Moreover, as the exhaust gas flows through the cooler, condensation of the steam present in this gas may occur; this steam is then reintroduced into the cylinder during the intake phase and it is likely to disturb the combustion of the fuel mixture.

Similarly, it is difficult to control the amount of exhaust gas flowing through the cooler and a quite significant amount of this gas may not be cooled.

The present invention aims to overcome the aforementioned drawbacks by means of a method for reintroducing exhaust gas to the intake of an internal-combustion engine of simple design.

SUMMARY OF THE INVENTION

The present invention thus relates to a method for reintroducing exhaust gas to the intake of an internal-combustion engine wherein, during the engine exhaust phase, part of the exhaust gas contained in the combustion chamber of the engine cylinder is fed, for an operating range of this engine, into a first fluid circulation circuit and the other part of said gas is discharged into an exhaust circuit, characterized in that the method consists:

during the engine intake phase, in cooling the exhaust gas fed into the fluid circulation circuit, in mixing the cooled recirculated exhaust gas with fresh supply air coming from the engine supply circuit, in feeding the mixture of recirculated exhaust gas and of supply air into a second fluid circulation circuit, and in cooling said mixture fed into the second circuit prior to feeding it into the combustion chamber.

The method can consist in closing at least part of the fluid circulation circuit and in feeding part of the exhaust gas into said closed part of the circuit so as to pressurize said gas.

The method can consist in providing cooling of the exhaust gas and of the mixture through a heat exchanger common to the two fluid circulation circuits.

The invention also relates to an internal-combustion engine comprising at least one cylinder with a combustion chamber, characterized in that it comprises at least two intake means with intake valves, a distributor connected to each intake means and an outlet pipe connecting each distributor to a fresh air supply circuit.

The engine can comprise a heat exchanger arranged on the two outlet pipes.

Advantageously, the heat exchanger can be a double-flow cooler.

The two outlet pipes can join the fresh air supply circuit in a junction zone.

Preferably, one of the outlet pipes can carry a throttling means.

The throttling means can be arranged between the distributor and the heat exchanger.

The engine can comprise control means allowing the lift laws of at least one of the valves to be varied.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
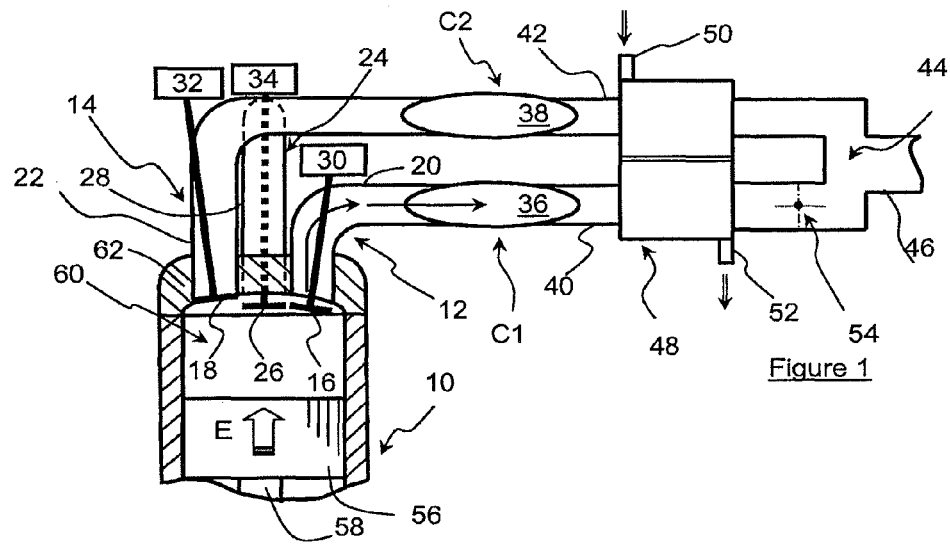
FIG. 1 is a diagram showing an internal-combustion engine using the method according to the invention, during the exhaust phase.

In FIG. 1, an internal-combustion engine of direct fuel injection diesel type comprises at least one cylinder 10 provided with at least two intakes 12, 14 with an intake valve 16, 18 and an intake pipe 20, 22 for each intake. In the description hereafter, intake 12 with valve 16 and pipe 20 is referred to as the intake/exhaust so as to better distinguish it from the intake 14 with its valve 18 and its pipe 22. The cylinder also comprises an exhaust circuit including at least one exhaust 24 with an exhaust valve 26, an exhaust pipe 28 and an exhaust manifold that is not shown.

Closing and opening of valve 16 of the intake/exhaust 12 and possibly of intake valve 18 is controlled by the valve actuation apparatus 30, 32 allowing the lift laws of these valves to be varied, notably at the opening and closing times thereof, independently of one another, such as those known as VVA (Variable Valve Actuation).

Similarly, exhaust valve 26 can be controlled by the valve actuation apparatus 34 allowing the lift laws of this valve to be varied, such as VVA type.

the valve actuation apparatus 30, 32 and 34 are controlled by a control unit, or engine calculator (not shown), any engine is usually equipped with, which notably allows the lift laws of these valves to be controlled according to the engine operating conditions or ranges.

As can be better seen in FIG. 1, intake pipe 20 ends at a distributor 36, referred to as intake/exhaust distributor, and pipe 22 ends at another intake distributor 38 distinct from distributor 36.

Outlet pipes 40, 42 of these distributors end at a junction zone made up of a branch line 44 connected to a pipe 46 belonging to the fresh air supply circuit. This fresh air can be air at ambient pressure or supercharged air, i.e. compressed by any means such as a turbocompressor.

A double-flow heat exchanger 48, or cooler, is arranged on the two outlet pipes 40, 42 between distributors 36, 38 and branch line 44 so as to be able to cool the fluid(s) circulating in these pipes. This cooler constantly carries, while the engine is running, a coolant (or heat carrier) that is introduced, at one end of the cooler, through an inlet 50 and flows out at the other end of this cooler through outlet 52. This cooler, referred to as single-pass cooler, thus allows to cool any fluid circulating in pipe 40, flowing therethrough in a first direction, then to cool this fluid or another fluid circulating in pipe 42, by running therethrough in the same direction or in another direction, generally the opposite direction.

It can be observed that the coolant fed into the cooler through inlet 50 is heated by exchange with the fluid circulating in pipe 42 and it reaches, with a higher coolant temperature than the inlet temperature, the other part of cooler 48 for exchange with the fluid circulating in pipe 40.

Preferably, the coolant used for the cooler comes from a bypass line of the engine cooling circuit or from a low-temperature water circuit.

Advantageously, but not obligatorily, a valve 54 is arranged on outlet pipe 40 between cooler 48 and branch line 44. This valve can also be located between intake/exhaust distributor 36 and cooler 48.

The valve can take all the positions contained between the fully open position (in dotted line in the figure) of outlet pipe 40 and its fully closed position (in axis line), or it can be a two-position valve with a fully open and a fully closed position.

Thus, this engine comprises a first fluid circulation circuit C1 with the intake/exhaust 12, intake/exhaust distributor 36, outlet pipe 40 carrying valve 54 and part of cooler 48. This engine also comprises a second fluid circulation circuit C2 including the intake 14, intake distributor 38 and outlet pipe 42 carrying the other part of cooler 48.

Furthermore, as it is widely known, cylinder 10 comprises a piston 56 movable in a reciprocating translational motion between a lower position, referred to as bottom dead centre (BDC), and an upper position, referred to as top dead centre (TDC), by a rod 58 connected to a crankpin of a crankshaft (not shown) such an engine is usually provided with.

This cylinder also comprises a combustion chamber 60 delimited by the top of the piston, the cylinder wall and the wall of cylinder head 62 opposite the piston. Intakes 12, 14 and the exhaust 24 open into this combustion chamber, as well as any fuel injection parts (not shown) allowing a fuel mixture to be obtained in the chamber.

In the example described in connection with the present invention, one considers that the engine runs according to a four-stroke mode, with an intake, a compression, an expansion and an exhaust phase.

Thus, when the engine runs under conditions that require recirculation of part of the exhaust gas to the intake, for example conditions corresponding to operation at low or medium loads, the engine calculator controls this engine in such a way that it runs with such an exhaust gas recirculation to the intake thereof.

Figure 3:
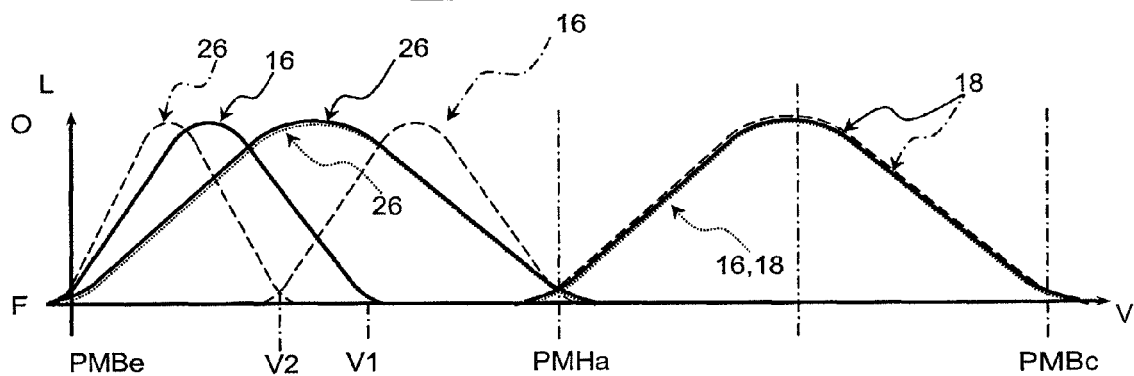
FIG. 3 shows curves illustrating the various lift laws of the intake and exhaust valves of the engine using the method according to the invention.

From the configuration illustrated in FIG. 1 and in connection with FIG. 3 showing the lift laws (in full line) of the corresponding intake valves 16, 18 and exhaust valve 26, piston 56 is in the neighborhood of its exhaust bottom dead centre (PMBe in FIG. 3), at the beginning of the engine exhaust phase. The valve actuation apparatus 30 and 34 are then controlled by the engine calculator so as to open intake valve 16 of the intake/exhaust 12 and exhaust valve 26. The hot exhaust gas contained in combustion chamber 60 is discharged, under the impulse of the motion of piston 56 towards the TDC as shown by arrow E, both into at least part of circulation circuit C1, i.e. at least into intake line 20 through valve 16 and intake/exhaust distributor 36, and through exhaust valve 26 into an exhaust manifold the engine is usually equipped with.

Intake valve 16 then closes under the impulse of control means 30 at a crank angle V1, whereas exhaust valve 26 remains open until it closes in the neighborhood of the intake top dead centre (PMHa) of the piston, as illustrated in FIG. 3.

Of course, the engine calculator controls means 30 controlling intake valve 16 in such a way that closing of this valve occurs at a crank angle V1 before the intake top dead centre PMHa, so that the exhaust gas cannot flow beyond intake/exhaust distributor 36 or, worse, branch line 44.

Of course, during this exhaust phase, valve 54 is in one of its open positions that can reach the fully open position.

Thus, after closing of intake valve 16 and of exhaust valve 26, the piston is in the neighborhood of the intake top dead centre PMHa and hot exhaust gas is present in intake pipe 20 and in intake/exhaust distributor 36, and possibly in pipe 40 and cooler 48.

Figure 2:
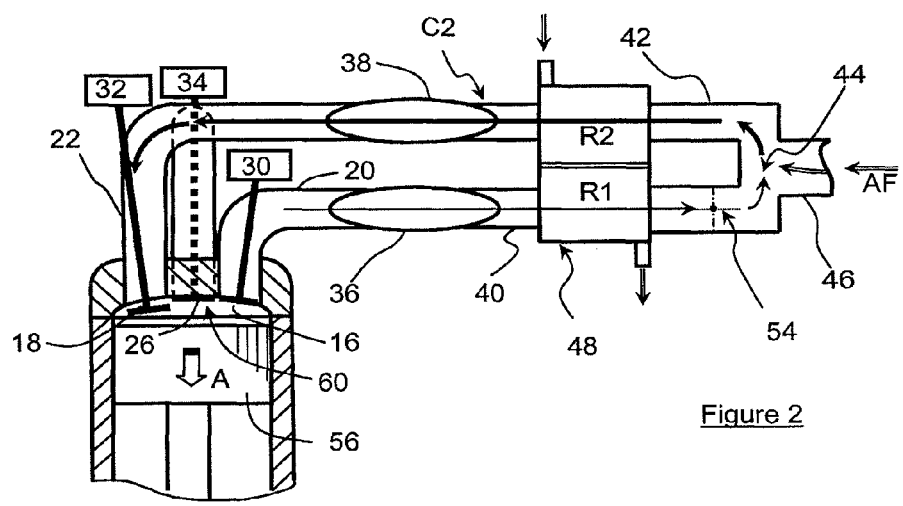
FIG. 2 is a diagram showing the engine of FIG. 1 in another stage of the method according to the invention.

During the next engine intake phase, as illustrated in FIG. 2 and still in connection with FIG. 3, piston 56 has a descending motion, shown by arrow A, from its intake top dead centre PMHa to its compression bottom dead centre PMBc. At the beginning of this intake phase where the piston is in the neighborhood of PMHa, the engine calculator controls the valve control means in such a way that intake valve 16 and exhaust valve 26 remain closed and intake valve 18 opens.

Under the effect of the descending motion of the piston, a depression is created through intake valve 18, and the exhaust gas contained in intake/exhaust pipe 20 and in intake/exhaust distributor 36 are led to circulate in outlet pipe 40. During this circulation, the exhaust gas flows through cooler 48 (arrow R1) and ends, in a cooled state, at branch line 44, valve 54 being in fully open position.

The fresh air that is allowed into pipe 46 (arrow AF) reaches branch line 44 where it mixes with the cooled exhaust gas. This mixture circulates then in second fluid circulation circuit C2, more precisely in outlet pipe 42 by flowing through cooler 48 in an opposite direction (arrow R2) to the direction of flow of the exhaust gas in pipe 40, and ends at intake distributor 38.

This distributor thus contains a mixture of fresh air and of exhaust gas that has been cooled by passage through the cooler.

This is particularly advantageous when using a fresh air that is supercharged by compression and that undergoes a temperature rise during this compression. This supercharged air must thereafter be subjected to cooling to recover all the characteristics sought for a compressed air, such as its density.

The mixture of fresh air and of exhaust gas is then sent through intake pipe 22 to intake valve 18, in open position, to be fed into combustion chamber 60. This introduction is continued until this valve closes in the neighborhood of the position of the piston corresponding to the compression bottom dead centre PMBc.

When the intake valve closes, the mixture present in the combustion chamber is quasi-homogeneous and at the desired temperature for the engine operating cycle to continue with the phase of compression of this mixture.

Advantageously, valve 54, as mentioned above, can be used for pressurizing the exhaust gas contained in the intake pipe, intake/exhaust distributor 36 and part of pipe 40. At the beginning of the engine exhaust phase, intake valve 16 of the intake/exhaust 12 and exhaust valve 26 are therefore open, whereas valve 54 is in a closed position (illustrated by an axis line in FIG. 1) of outlet pipe 40, thus isolating this pipe from branch line 44. Under the combined effect of the pressure of the exhaust gas leaving combustion chamber 60 and of the motion of piston 56 as shown by arrow E, the volume delimited by intake pipe 20, intake/exhaust distributor 36 and part of outlet pipe 40 between this distributor and valve 54 is at a higher pressure than the pressure of the supply air in pipe 46. The exhaust gas under pressure is thus contained in at least a closed part of circuit C1 between valve 16 and valve 54.

Thus, during the next intake phase illustrated in FIG. 2, exhaust valve 26 and intake valve 16 are in a closed position, intake valve 18 opens and valve 54 is actuated into the open position (dotted line in FIG. 2). Under the effect of the pressure prevailing upstream from this valve (considering the direction of circulation from intake/exhaust valve 16 to branch line 44) combined with the depression, downstream from this valve, generated by piston 56 as it moves in the direction shown by arrow A, the exhaust gas circulates in the direction of branch line 44 by flowing through cooler 48.

This cooled exhaust gas then mixes with the fresh air fed into pipe 46 and the process continues as described above.

During engine operation without exhaust gas recirculation, notably at high or full loads, it is not necessary to send the exhaust gas to the engine intake and the engine runs under conventional conditions.

In this case, as illustrated in FIG. 3 for the lift laws of intake valves 16, 18 and of exhaust valve 26 shown in dotted lines, only exhaust valve 26 is actuated during the exhaust phase through the agency of control means 34. This valve opens in the neighborhood of the exhaust bottom dead centre PMBe and it closes in the neighborhood of the intake top dead centre PMHa, thus allowing discharge of the exhaust gas contained in the combustion chamber to the exhaust manifold.

Figure 4:
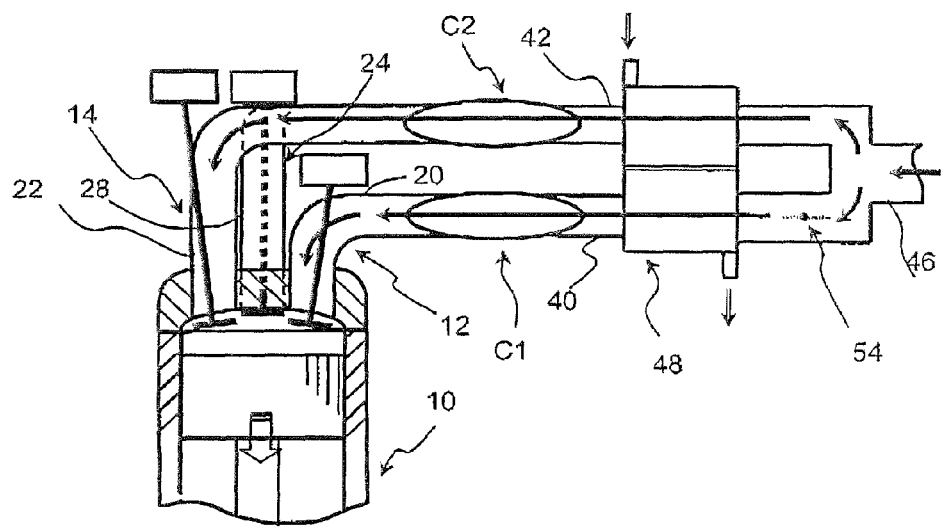
FIG. 4 is a diagram showing the engine of FIG. 1 in another stage of the method according to the invention.

During the intake phase, one or the other of intake valves 16, 18, preferably both, are actuated between an open position in the neighborhood of PMHa and a closed position in the neighborhood of the compression bottom dead centre PMBc. During opening of these two intake valves, as illustrated in FIG. 4, the fresh air fed into pipe 46 reaches branch line 44 where it divides into two streams, a stream circulating through circuit C1 in pipe 40 in the direction of intake valve 16 and another stream circulating through second circuit C2 in pipe 42 in the direction of valve 18. These two streams flow through cooler 48 in the same direction and they are cooled prior to reaching distributors 36, 38. From these distributors, the cooled air streams circulate in intake pipes 20, 22, then they are fed into combustion chamber 60 through intake valves 16, 18.

By means of this layout, in cases where the fresh air is supercharged air, it is cooled prior to being fed into the combustion chamber. Furthermore, circulation of a supercharged air under pressure in an opposite direction to the direction of circulation of the exhaust gas (direction R1) in outlet pipe 40 allows to remove a large part of the impurities present in the exhaust gas and adhering to the constituent elements of the cooler in contact with this gas, such as soots.

The invention furthermore allows to use a single exchanger providing, from the same place, both cooling of the recirculated exhaust gas and of the supercharged fresh air.

In the example described above for exhaust gas recirculation to the engine intake, exhaust valve 26 and intake valve 16 open substantially simultaneously at the beginning of the exhaust phase, but the lift laws of these exhaust and intake valves 26 and 16 can be different from those described above. The main thing is that the interval between the opening and the closing of intake/exhaust valve 16 occurs during the engine exhaust phase.

Thus, as shown by dashed lines in FIG. 3, exhaust valve 26 opens at the exhaust bottom dead centre PMBe, then it closes at crank angle V2 and discharges part of the exhaust gas contained in the combustion chamber towards the exhaust manifold. In the neighborhood of this angle V2, intake/exhaust valve 16 opens, then it closes in the neighborhood of the intake top dead centre PMHa with discharge, to intake/exhaust distributor 36, of the exhaust gas still contained in chamber 60. For the next engine intake phase, intake valve 18 behaves as described above.

It can be noted that, for some engine operating ranges, such as engine cold operation, it may be necessary to reintroduce to the intake exhaust gas that has not been cooled.

During the intake phase that follows the exhaust phase of FIG. 1, valves 16 and 18 are therefore open throughout the phase. The hot exhaust gas contained in pipe 20 and in intake/exhaust distributor 36 is fed into combustion chamber 60 through intake valve 16, and the fresh air circulating in circuit C2, from fresh air supply pipe 46, is fed into this chamber through intake valve 18.

Thus, at the end of the intake phase, a stratified mixture of fresh air and of recirculated exhaust gas is present in the chamber.

By means of the invention, it is possible to do without or at least to simplify the conventional EGR circuit.

Furthermore, it is no longer necessary to bypass the cooler if warm exhaust gas is to be reintroduced to the intake, notably for the cold operating range of the engine.

Furthermore, when the engine runs without exhaust gas recirculation and with supply air circulation both in pipe 40 and in pipe 42, valve 54 can be used as a swirl control valve so as to feed into the combustion chamber the fresh air in such a way that it is subjected to a rotating motion (or swirl) around the vertical general axis of the cylinder.

Moreover, the double-flow cooler allows to avoid or to limit condensation of the steam present in the exhaust gas when the gas flows through this cooler. The heat-carrying fluid used for cooling the exhaust gas reaches the part of this cooler concerned by this cooling at a temperature that is higher than its inflow temperature. Cooling of the recirculated exhaust gas and of the air/recirculated exhaust gas mixture thus takes place progressively, which avoids or limits condensation of the steam in this gas and in this mixture: first the recirculated exhaust gas with moderate cooling, then the air/recirculated exhaust gas mixture with more intense cooling.

In the case of supercharged fresh air, the invention also allows to use a turbocompressor that can operate at a lower exhaust pressure upstream from the turbine than the intake pressure downstream from the compressor.

The present invention is not limited to the example described and it encompasses any variant and equivalent.

Notably, it is possible to use control means comprising no camshaft instead of VVA type control means. In this case, an actuating means dedicated to each valve, such as an electromagnetic, hydraulic, electrohydraulic, pneumatic or electropneumatic actuator, allows to directly or indirectly act on the valve rod of the intake and exhaust valves.

The invention claimed is:

1. A method for reintroducing exhaust gas and fresh air to the intake of an internal-combustion engine wherein, during the engine exhaust phase, part of the exhaust gas contained in the combustion chamber of a cylinder of the engine is fed, for an operating range of this engine, into a first fluid circulation circuit (C1) and the other part of said gas is discharged into an exhaust circuit, characterized in that the method comprises:
    during the engine exhaust phase, opening an intake/exhaust valve and feeding the exhaust gas into the first fluid circulation circuit (C1) through an intake/exhaust connected to the first fluid circulation circuit (C1), and opening an exhaust valve and feeding the exhaust gas into an exhaust pipe of an exhaust manifold of the engine through an exhaust connected to the exhaust pipe of the exhaust manifold of the engine;
    during the intake phase, closing the intake/exhaust valve, closing the exhaust valve, opening an intake valve after closing the intake/exhaust valve and cooling the exhaust gas fed into the first fluid circulation circuit (C1),
    mixing the cooled recirculated exhaust gas with fresh supply air (AF) coming from the engine supply circuit and flowing into the first fluid circulation circuit (C1),
    feeding the mixture of recirculated cooled exhaust gas and supply air into a second fluid circulation circuit (C2),
    cooling said mixture fed into the second fluid circulation circuit (C2) prior to feeding it into the combustion chamber, and
    supplying the mixture of the cooled exhaust gas and the fresh air into the combustion chamber through the second fluid circulation circuit (C2) via the intake valve.

2. A method as claimed in claim 1, further comprising closing at least part of the first fluid circulation circuit (C1) and feeding part of the exhaust gas into said closed part of the circuit so as to pressurize said gas.

3. A method as claimed in claim 1, further comprising cooling the exhaust gas and the mixture by a heat exchanger common to the two fluid circulation circuits (C1, C2).

4. An internal-combustion engine as claimed in claim 1, characterized in that one of the pipes carries a valve.

5. An internal-combustion engine as claimed in claim 4, characterized in that the valve is arranged between a distributor and the heat exchanger.

6. An internal-combustion engine as claimed in claim 1, characterized in that it comprises a valve actuation apparatus allowing the lift laws of at least one of valves to be varied.

7. An internal-combustion engine comprising at least one cylinder with a combustion chamber, characterized in that it comprises:
    a first fluid circulation circuit (C1) including an intake/exhaust with an intake/exhaust valve, a cooler, a distributor and an outlet pipe,
    a second fluid circulation circuit (C2) including an intake with an intake valve, a cooler, a distributor and an outlet pipe,
    an exhaust circuit including an exhaust with an exhaust valve and an exhaust pipe of an exhaust manifold of the engine, and
    a fresh air supply circuit connected to the outlet pipe of the first fluid circulation circuit (C1) and to the outlet pipe of the second fluid circulation circuit (C2) that supplies fresh air to the first fluid circulation circuit (C1) and to the second fluid circulation circuit (C2) respectively,
    wherein during the engine exhaust phase, opening the intake/exhaust valve and feeding exhaust gas into the first fluid circulation circuit (C1) through the intake/exhaust via the intake/exhaust valve connected to the first fluid circulation circuit (C1), and opening the exhaust valve and feeding exhaust gas through the exhaust via exhaust valve into the exhaust pipe of the exhaust manifold of the engine;
    wherein during the intake phase, closing the intake/exhaust valve, closing the exhaust valve, opening the intake valve after closing the intake/exhaust valve and cooling the exhaust gas twice with the cooler and supplying the mixture of the cooled exhaust gas and the fresh air into the combustion chamber through the second fluid circulation circuit (C2) through the intake via the intake valve.

8. An internal-combustion engine as claimed in claim 7, characterized in that it comprises a heat exchanger, which is the cooler, arranged on the two outlet pipes.

9. An internal-combustion engine as claimed in claim 8, characterized in that the heat exchanger is a double-flow cooler.

10. An internal-combustion engine as claimed in claim 7, characterized in that the two outlet pipes join fresh air supply circuit in a junction zone.

11. An internal-combustion engine as claimed in claim 7, further comprising a valve actuation apparatus allowing the lift laws of at least one of the intake valves to be varied.

* * * * *